US011485332B2

(12) United States Patent
Terasaka et al.

(10) Patent No.: US 11,485,332 B2
(45) Date of Patent: Nov. 1, 2022

(54) VEHICLE BRAKING CONTROL DEVICE

(71) Applicant: ADVICS CO., LTD., Kariya (JP)

(72) Inventors: Masato Terasaka, Kariya (JP); Chisa Kitahara, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 17/277,843

(22) PCT Filed: Oct. 25, 2019

(86) PCT No.: PCT/JP2019/041913
§ 371 (c)(1),
(2) Date: Mar. 19, 2021

(87) PCT Pub. No.: WO2020/090657
PCT Pub. Date: May 7, 2020

(65) Prior Publication Data
US 2022/0118958 A1    Apr. 21, 2022

(30) Foreign Application Priority Data

Oct. 29, 2018 (JP) .............................. JP2018-203040

(51) Int. Cl.
*B60T 8/17*    (2006.01)
*B60T 8/1755*    (2006.01)
*B60T 8/1764*    (2006.01)

(52) U.S. Cl.
CPC .......... *B60T 8/1755* (2013.01); *B60T 8/1764* (2013.01); *B60T 2201/16* (2013.01); *B60T 2210/124* (2013.01); *B60T 2250/03* (2013.01); *B60T 2250/04* (2013.01); *B60T 2260/024* (2013.01)

(58) Field of Classification Search
None
See application file for complete search history.

(56) References Cited

U.S. PATENT DOCUMENTS

2015/0283918 A1* 10/2015 Honda ................... F16H 48/06
903/909
2016/0193989 A1    7/2016 Terasaka et al.

FOREIGN PATENT DOCUMENTS

| CN | 103303284 A   | * | 9/2013  | .......... B60T 8/17551 |
| DE | 102004017845 B4 | * | 2/2016  | ............ B60T 8/1755 |
| DE | 102017008948 A1 | * | 3/2019  | ............ B60T 13/662 |
| EP | 3747669 A1    | * | 12/2020 | ............ B60T 13/662 |

(Continued)

OTHER PUBLICATIONS

International Search Report (PCT/ISA/210) with translation and Written Opinion (PCT/ISA/237) dated Dec. 10, 2019, by the Japanese Patent Office as the International Searching Authority for International Application No. PCT/JP2019/041913.

*Primary Examiner* — Melanie Torres Williams
(74) *Attorney, Agent, or Firm* — Buchanan Ingersoll & Rooney PC

(57) ABSTRACT

In a braking control device, a controller is configured to determine an inside and an outside of a turn by using the yaw rate, to calculate a deflection index based on a standard turning amount corresponding to a steering angle and an actual turning amount corresponding to a yaw rate, to reduce the braking torque of the rear wheel on the outside of the vehicle turn based on the deflection index when an excessive deceleration slip of the rear wheel on the inside of the vehicle turn is inhibited during an execution of anti-skid control.

2 Claims, 5 Drawing Sheets

(56) References Cited

FOREIGN PATENT DOCUMENTS

| EP | 3328693 | B1 | * | 1/2021 | ............. | B60T 8/172 |
| GB | 2522516 | A | * | 7/2015 | ............ | B60T 8/1764 |
| JP | H11301447 | A | | 11/1999 | | |
| JP | 2014124972 | A | | 7/2014 | | |
| JP | 2020199823 | A | * | 12/2020 | | |

* cited by examiner

VEHICLE BRAKING CONTROL DEVICE

TECHNICAL FIELD

The present disclosure relates to a vehicle braking control device.

BACKGROUND ART

Patent Literature 1 describes, for the purpose of improving the control quality of a brake control device that performs the ABS control, providing on a control unit k that includes a control amount determination unit k1 for determining a control amount of an ABS unit e based on an input from a vehicle behavior detection means g and executes the ABS control for preventing the wheels from being locked at the time of braking, a control wheel speed calculation unit k2 that obtains each wheel speed from a detected value of a wheel speed sensor f, a turning determination unit k4 that determines a turning state based on a vehicle body left side speed and a vehicle body right side speed obtained from a vehicle body left and right side speed calculation unit k3, and rear wheel speed determination unit k5 that determines the way of obtaining the wheel speed for control of the rear wheel according to the determined turning state and the vehicle body acceleration obtained from the change in wheel speed, where the rear wheel speed determination unit k5 determines the wheel speed for the control of the rear wheels by the rear two-wheel select low control at normal times, triangular select low control at the time of low p turn sudden braking, and the rear two-wheel independent control at the time of high p turn sudden braking.

This rear wheel triangular select low control and this rear two-wheel select low control are defined as follows. The rear wheel triangular select low control means, for example, when the left rear wheel is considered as the control target wheel, selecting a lower value of a wheel speed (maxVwFR, VwRR) in a higher direction of the front and rear wheels on the right side and the wheel speed VwRL of the left rear wheel, with the wheel speed of the rear wheel as Vw and the wheel acceleration as ΔVw. In addition, the rear two-wheel select low control selects the lower value of the wheel speeds of the left and right rear wheels, with the wheel speed of the rear wheel as Vw and the wheel acceleration as ΔVw.

Patent Literature 2 describes, for the purpose of ensuring the stability of the vehicle behavior and then increasing the deceleration of the vehicle when performing an anti-lock brake control of the select low method on a vehicle traveling on a split road, a vehicle braking control device that performs an anti-lock brake control in the select low method that, during a decreasing period (PD) of decreasing a braking force with respect to a first wheel (LFW) having a slower wheel speed (VW) of both left and right wheels, also decreases the braking force with respect to a second wheel (HFW) having a faster wheel speed (VW) of both left and right wheels, and during an increasing period (PI) of increasing the braking force with respect to the first wheel (LFW), also increases the braking force with respect to the second wheel (HFW), where when performing the anti-lock brake control, the braking force with respect to the second wheel (HFW) is made larger when the unstable tendency of the vehicle behavior is small compared to when the unstable tendency of the vehicle behavior is large. For example, the amount of decrease in the braking force (DP_RR, DP_RL) with respect to the second wheel (HFW) during the decreasing period (PD) is made small when the unstable tendency of the vehicle behavior is small compared to when the unstable tendency of the vehicle behavior is large. Furthermore, the amount of increase in the braking force (BP_RR, BP_RL) with respect to the second wheel (HFW) during the increasing period (PI) is made large when the unstable tendency of the vehicle behavior is small compared to when the unstable tendency of the vehicle behavior is large.

Directional stability and deceleration performance of the vehicle may unfavorably interfere with each other during the execution of the anti-skid (or anti-lock brake or ABS) control. For example, as in Patent Literatures 1 and 2, if the select low method is adopted for the braking hydraulic pressure Pwr of the rear wheel WHr, directional stability is ensured during braking at the time of turning of the vehicle or on a split road, but there is still room for improvement in deceleration. That is, it is desired that the directional stability and the deceleration of the vehicle can be balanced at a high level during turning braking and split road braking.

CITATIONS LIST

Patent Literature

Patent Literature 1: Japanese Unexamined Patent Application Publication No. 11-301447
Patent Literature 2: Japanese Unexamined Patent Application Publication No. 2014-124972

SUMMARY

Technical Problems

An object of the present disclosure is to provide a vehicle braking control device capable of suitably achieving both directional stability and deceleration performance of a vehicle during an execution of an anti-skid control when the vehicle is turning, or is on a split coefficient of friction surface.

Solutions To Problems

The vehicle braking control device according to the present disclosure includes an actuator for individually adjusting braking torque of each wheel of a vehicle; wheel speed sensors for each detecting speed of each wheel; a yaw rate sensor for detecting a yaw rate of the vehicle; a steering angle sensor for detecting a steering angle of the vehicle; and a controller for controlling the actuator to independently adjust each braking torque of rear wheels that are a rear left wheel or a rear right wheel of the vehicle by using the speed of each wheel, the yaw rate, and the steering angle.

In the vehicle braking control device according to the present disclosure, the controller is for determining an outside and an inside of a turn by using the yaw rate, for calculating a deflection index by using a standard turning amount corresponding to the steering angle and an actual turning amount corresponding to the yaw rate, for reducing a braking torque of the rear wheel on the outside of the turn by using the deflection index when an excessive deceleration slip of the rear wheel on the inside of the turn during is inhibited during an execution of an anti-skid control. p As explained above, the independent adjustment of each brake torque of the rear wheel that are the right or left wheel during the execution of anti-skid control may enable the vehicle to sufficiently decelerate and may enable the braking distance to shorten. Furthermore, when the deflection index is less than or equal to a start predetermined amount (or first start predetermined amount), the braking torque of the outside rear wheel on the outside of a turn (e.g., an outside rear wheel hydraulic pressure) reduces. This may enhance the vehicle stability. As a result, the directional stability and the deceleration performance may be well balanced during the execution of the anti-skid control.

In the vehicle braking control device according to the present disclosure, the controller is configured to determine by using speed of each wheel whether the vehicle is on a split coefficient of friction road surface, to determine which the rear wheel is on a lower coefficient of friction road surface, and which the rear wheel is on a higher coefficient of friction road surface, to calculate a deflection index by using a standard turning amount corresponding to the steering angle and an actual turning amount corresponding to the yaw rate, to reduce the braking torque of the rear wheel on the higher coefficient of friction road surface by using the deflection index when an excessive deceleration slip of the rear wheel on the lower coefficient of friction road surface is inhibited during an execution of anti-skid control.

As explained above, the independent adjustment of each brake torque of the rear wheel that are the right or left wheel during the execution of anti-skid control may enable the vehicle to sufficiently decelerate. Furthermore, when the deflection index is less than or equal to a start predetermined amount (or a second start predetermined amount), the braking torque of the rear wheel on the higher coefficient of friction road surface (e.g., higher friction side rear wheel hydraulic pressure) is reduced. This may maintain the directional stability of the vehicle. As a result, the directional stability and the deceleration performance may be well balanced during braking on the split coefficient of friction road surface.

DESCRIPTION OF EMBODIMENT

{Reference Letters and Numerals of Configuring Members, etc., Letters at the End of the Reference Letters and Numerals, and Notion/Moving Direction}

In the following description, configuring members, calculation processes, signals, characteristics, and values having the same reference letters such as "ECU" have the same functions. The letters at the end of reference letters and numerals, such as "i" to "l", are comprehensive letters indicating which wheel they relate to. Specifically, "i" indicates a right front wheel, "j" indicates a left front wheel, "k" indicates a right rear wheel, and "l" indicates a left rear wheel. For example, each of the four wheel cylinders is described as wheel cylinder CWi of the right front wheel, wheel cylinder CWj of the left front wheel, wheel cylinder CWk of the right rear wheel, and wheel cylinder CWl of the left rear wheel. Furthermore, the letters "i" to "l" at the end of the reference letters and numerals can be omitted. When the letters "i" to "l" are omitted, each reference letter and numeral represents a generic name of each of the four wheels. For example, "WH" represents each wheel, and "CW" represents each wheel cylinder.

The numerals of the end of various the reference letters and numerals, such as "1" and "2", are comprehensive numerals indicating which of the two braking systems they relate to. Specifically, "1" indicates the first system and "2" indicates the second system. For example, in the two master cylinder fluid passages, they are expressed as a first master cylinder fluid passage HM1 and a second master cylinder fluid passage HM2. Furthermore, the numerals "1" and "2" at the end of the reference letters and numerals can be omitted. When the numerals "1" and "2" are omitted, each symbol represents a generic name of each of the two braking systems. For example, "HM" represents the master cylinder fluid passage of each braking system.

The letters "f" and "r" added to the end of various reference letters and numerals are comprehensive letters indicating the longitudinal direction of the vehicle they relate to. Specifically, "f" indicates the front wheel, and "r" indicates the rear wheel. For example, if the vehicle has the four wheels, the front wheel is described as WHf and the rear wheel is described as WHr. Furthermore, the letters "f" and "r" at the end of the letters can be omitted. When the subscripts "f" and "r" are omitted, each symbol represents the generic name thereof. For example, "WH" represents each of the four wheels.

{Embodiment of a Vehicle Braking Control Device According to the Present Disclosure}

Figure 1:
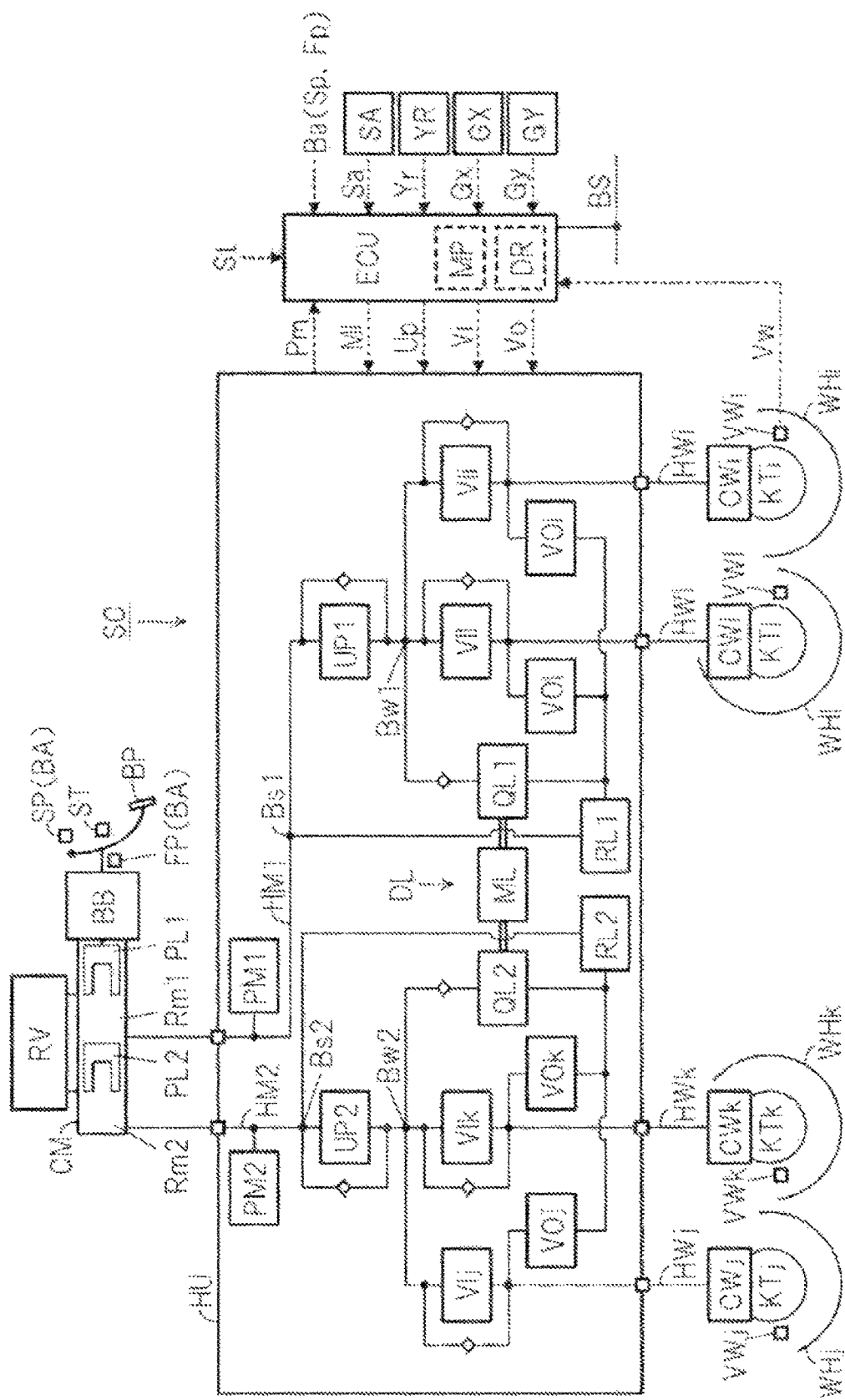
FIG. 1 is an overall configuration view describing an embodiment of a braking control device SC of a vehicle according to the present disclosure.

An embodiment of a braking control device SC according to the present disclosure will be described with reference to an overall configuration view of FIG. 1. A master cylinder CM is connected to a wheel cylinder CW by way of a master cylinder fluid passage HM and a wheel cylinder fluid passage HW. The fluid passage is a passage for flowing braking fluid BF which is the working fluid of the braking control device SC, and corresponds to a brake piping, a fluid path of a fluid unit, a hose, and the like. The inside of the fluid passage is filled with the braking fluid BF. In the fluid passage, the side closer to the reservoir RV is called "upstream", and the side closer to the wheel cylinder CW is called "downstream".

The vehicle employs two systems of fluid passages. A first system, which is a system related to a first master cylinder chamber Rm1, of the two systems is connected to the wheel cylinders CWi and CWl. A second system, which is a system related to a second master cylinder chamber Rm2, is connected to the wheel cylinders CWj and CWk. That is, a so-called diagonal type (or X type) is adopted as the two-system fluid passage of the vehicle.

The vehicle equipped with the braking control device SC includes a braking operation member BP, a wheel cylinder CW, a reservoir RV, a master cylinder CM, and a brake booster BB. The braking operation member (e.g., a brake pedal) BP is a member operated by the driver to decelerate the vehicle. A braking torque Tq of the wheel WH is adjusted, and the braking force is generated at the wheel WH by operating the braking operation member BP.

A rotating member (e.g., a brake disc) KT is fixed to each wheel WH of the vehicle. A brake caliper is arranged to sandwich the rotating member KT. The wheel cylinder CW is provided in the brake caliper. The pressure (or braking hydraulic pressure) Pw of the braking fluid BF in the wheel cylinder CW is increased, and then the friction member (e.g., a brake pad) is pressed against the rotating member KT. Since the rotating member KT and the wheel WH are fixed to rotate integrally, a braking torque Tq is generated at the wheel WH by the frictional force generated at this time. The braking torque Tq causes a deceleration slip Sw at the wheel WH, and then a braking force is generated.

The master reservoir (or a reservoir), which is an atmospheric pressure reservoir RV is a tank for the working fluid, in which the braking fluid BF is stored. The master cylinder CM is mechanically connected to the braking operation member BP with a brake rod, a clevis (or U-shaped link) and the like. The master cylinder CM is a tandem type, and its interior is divided into master cylinder chambers Rm1 and Rm2 by master pistons PL1 and PL2. When the braking operation member BP is not operated, the master cylinder chambers Rm1, Rm2 of the master cylinder CM are in a communicating state with the reservoir RV. Master cylinder fluid passages HM1 and HM2 are connected to the master cylinder CM. When the braking operation member BP is operated, the master pistons PL1, PL2 move forward, and then the master cylinder chambers Rm1, Rm2 are fluidly disconnected from the reservoir RV. When the operation of the braking operation member BP is increased, the braking fluid BF is pressure fed from the master cylinder CM toward the wheel cylinder CW through the master cylinder fluid passages HM1, HM2.

The operation force Fp of the braking operation member BP by the driver is boosted by the brake booster (or a booster) BB. A vacuum booster BB is adopted. The vacuum is generated by an engine or an electric vacuum pump. Instead of the vacuum booster BB, an electric booster or an accumulator type hydraulic booster, which are moved by an electric motor, can be used.

Furthermore, the vehicle includes a wheel speed sensor VW, a steering angle sensor SA, a yaw rate sensor YR, a longitudinal acceleration sensor GX, a lateral acceleration sensor GY, a braking operation amount sensor BA, and an operation switch ST. Each wheel WH of the vehicle includes a wheel speed sensor VW to detect the wheel speed Vw. The signal of the wheel speed Vw is used for independent hydraulic pressure control at each wheel such as anti-skid control (or anti-lock brake control) for inhibiting the lock tendency (i.e., excessive deceleration slip) of the wheel WH.

A steering operation member (e.g., a steering wheel) is provided with a steering angle sensor SA that detects a steering angle Sa (or a steering angles of the front wheels WHi, WHj which are steering wheels). The vehicle body includes a yaw rate sensor YR to detect a yaw rate (or a angular velocity) Yr. Furthermore, the longitudinal acceleration sensor GX and the lateral acceleration sensor GY are provided to detect the acceleration (or a longitudinal acceleration) Gx in the longitudinal direction (or an advancing direction) of the vehicle and the acceleration (or a lateral acceleration) Gy in the lateral direction (or a direction perpendicular to the advancing direction).

A braking operation amount sensor BA is provided to detect an operation amount Ba of the braking operation member BP (or the brake pedal) by the driver. The braking operation amount sensor BA can be at least one of a master cylinder hydraulic pressure sensor PM detecting the hydraulic pressure in the master cylinder CM (or the master cylinder hydraulic pressure) Pm, an operation displacement sensor SP detecting the operation displacement Sp of the braking operation member BP, and an operation force sensor FP detecting the operation force Fp of the braking operation member BP.

The operation switch ST is provided to detect whether the driver operate the braking operation member BP. When the braking operation member BP is not operated (i.e., at the time of non-braking), an OFF signal is output as the operation signal St by the operation switch ST. On the other hand, when the braking operation member BP is operated (i.e., at the time of braking), an ON signal is output as the operation signal St.

{Electronic Control Unit ECU}

The braking control device SC includes a controller ECU and a fluid unit HU (corresponding to an actuator).

The controller (or the electronic control unit) ECU includes an electric circuit substrate on which a microprocessor MP or the like is mounted and a control algorithm programmed in the microprocessor MP. The controller ECU is network-connected to another controller through an in-vehicle communication bus BS to share signals, such as detected values, calculated values.

A braking operation amount Ba, a wheel speed Vw, a yaw rate Yr, a steering angle Sa, a longitudinal acceleration Gx, and a lateral acceleration Gy are input to the controller ECU. The controller ECU (or the electronic control unit) controls the electric motor ML of the fluid unit HU and electromagnetic valves UP, VI, and VO on the basis of the input signals, such as Vw. Specifically, drive signals Up, Vi, and Vo for controlling the electromagnetic valves UP, VI, and VO and a drive signal Ml for controlling the electric motor ML is calculated on the basis of the control algorithm.

The controller ECU includes a drive circuit DR for driving the electromagnetic valves UP, VI, VO, and the electric motor ML. The drive circuit DR includes a bridge circuit composed of switching elements, which can be power semiconductor devices such as MOS-FET and IGBT, to drive the electric motor ML. Furthermore, the drive circuit DR includes switching elements to drive the electromagnetic valves UP, VI, VO. The energization states (or the excited states) of the valves UP, VI, VO are controlled. The drive circuit DR includes an energization amount sensor (or a current sensor) that detects the actual energization amount (or a supply current) of the electric motor ML and the electromagnetic valves UP, VI, and VO.

{Fluid Unit HU}

A known fluid unit HU is provided between the master cylinder CM and the wheel cylinder CW. The fluid unit (or the actuator) HU includes an electric pump DL, a low-pressure reservoir RL, a pressure adjusting valve UP, a master cylinder hydraulic pressure sensor PM, an inlet valve VI, and an outlet valve VO.

The electric pump DL includes one electric motor ML and two fluid pumps QL1 and QL2. When the first and second fluid pumps QL1 and QL2 are moved by the electric motor ML, the braking fluid BF is pumped from suction portions Bs1 and Bs2, which is located upstream of the pressure adjusting valve UP. The pumped braking fluid BF is discharged to discharge portions Bw1 and Bw2, which is located downstream of the pressure adjusting valve UP. The low-pressure reservoirs RL1, RL2 are located on the suction side of the fluid pump QL.

The first and second pressure adjusting valves UP1 and UP2 are provided in the first and second master cylinder fluid passages HM1 and HM2. A linear electromagnetic valve (or a differential pressure valve) is used as the pressure adjusting valve UP where a valve opening amount (or a lift amount) is continuously controlled on the basis of the energization state (e.g., supply current). A normally-open electromagnetic valve is used as the pressure adjusting valve UP. A target energization amount of the pressure adjusting valve UP is determined on the basis the calculation results, which may be a target hydraulic pressure of the wheel cylinder CW, of the vehicle stabilization control, the automatic braking control, and the like. The drive signal Up is determined on the basis of the target energization amount, the energization amount (or current) to the pressure adjusting valve UP is adjusted, and the valve opening amount thereof is adjusted.

When the fluid pump QL is driven, a reflux of the braking fluid BF occurs. When the pressure adjusting valve UP is not energized and the normally-open pressure adjusting valve UP is in a fully opened state, the hydraulic pressure (or the master cylinder hydraulic pressure Pm) in upstream of the pressure adjusting valve UP is substantially the same as the hydraulic pressure Pp in downstream of the pressure adjusting valve UP. When the energization amount of the normally-open pressure adjusting valve UP increases and the valve opening amount of the pressure adjusting valve UP decreases, the reflux amount of the braking fluid BF reduces, and then the downstream hydraulic pressure Pp(=Pw) increases from the upstream hydraulic pressure Pm by the orifice effect. As the electric pump DL and the pressure adjusting valve UP are controlled, the braking hydraulic pressure Pw increases from the master cylinder hydraulic pressure Pm corresponding to the operation of the braking operation member BP. First and second master cylinder hydraulic pressure sensors PM1, PM2 are provided upstream of the pressure adjusting valve UP to detect the first and second master cylinder hydraulic pressures Pm1, Pm2. In this case, one of the two master cylinder hydraulic pressure sensors PM1 and PM2 can be omitted due to Pm1=Pm2.

The first and second master cylinder fluid passages HM1 and HM2 are branched (divided) into the wheel cylinder fluid passages HWi to HWl at the downstream (or branch portions) Bw1 and Bw2 of the pressure adjusting valve UP, and connected to each wheel cylinder CWi to CWl. Inlet valves VIi to VIl are provided in the wheel cylinder fluid passages HWi to CWl. The wheel cylinder fluid passage HW is connected to the low-pressure reservoir RL at the downstream of the inlet valve VI (between the inlet valve VI and the wheel cylinder CW) through the outlet valve VO. The fluid passage connecting the wheel cylinder fluid passage HW and the low-pressure reservoir RL is referred to as a reservoir fluid passage. The outlet valve VO consequently is provided in the reservoir fluid passage.

A normally-open on/off electromagnetic valve is used as the inlet valve VI. In addition, a normally-closed on/off electromagnetic valve is used as the outlet valve VO. The electromagnetic valves VI and VO are controlled by the controller ECU on the basis of the drive signals Vi and Vo. The braking hydraulic pressure Pw of each wheel WH can be independently controlled with the inlet valve VI and the outlet valve VO. A linear electromagnetic valve may be used instead of the on/off electromagnetic valve as at least one of the inlet valve VI and the outlet valve VO.

In the inlet valve VI and the outlet valve VO, the configuration related to each wheel WH is the same. A normally-open inlet valve VI is provided in the wheel cylinder fluid passage HW, which connects the portion Bw and the wheel cylinder CW. The wheel cylinder fluid passage HW is connected to the low-pressure reservoir RL at the downstream of the inlet valve VI through the normally-closed outlet valve VO.

During the execution of the anti-skid (or ABS) control, the inlet valve VI closes and the outlet valve VO open to reduce the hydraulic pressure (or the braking hydraulic pressure) Pw in the wheel cylinder CW. This decrease in the braking hydraulic pressure Pw is due to inhibition of the inflow of the braking fluid BF from the inlet valve VI an outflow of the braking fluid BF in the wheel cylinder CW to the low-pressure reservoir RL. Furthermore, the inlet valve VI opens and the outlet valve VO closes to increase the braking hydraulic pressure Pw. The outflow of the braking fluid BF to the low-pressure reservoir RL is inhibited, the downstream hydraulic pressure Pp adjusted with the pressure adjusting valve UP is introduced into the wheel cylinder CW, and the braking hydraulic pressure Pw is increased. Furthermore, both the inlet valve VI and the outlet valve VO close to hold the braking hydraulic pressure Pw.

The braking torque Tq on the wheel WH is increased or reduced (or adjusted) by increasing or reducing the braking hydraulic pressure Pw. When the braking hydraulic pressure Pw increase, the force with which the friction material is pressed against the rotating member KT increase, and the braking torque Tq increase. As a result, the braking force on the wheel WH increase. On the other hand, when the braking hydraulic pressure Pw reduce, the pressing force from the friction material to the rotating member KT decreases, and the braking torque Tq reduces. As a result, the braking force on the wheel WH is reduced.

{Calculation Process in the Controller ECU}

Figure 2:
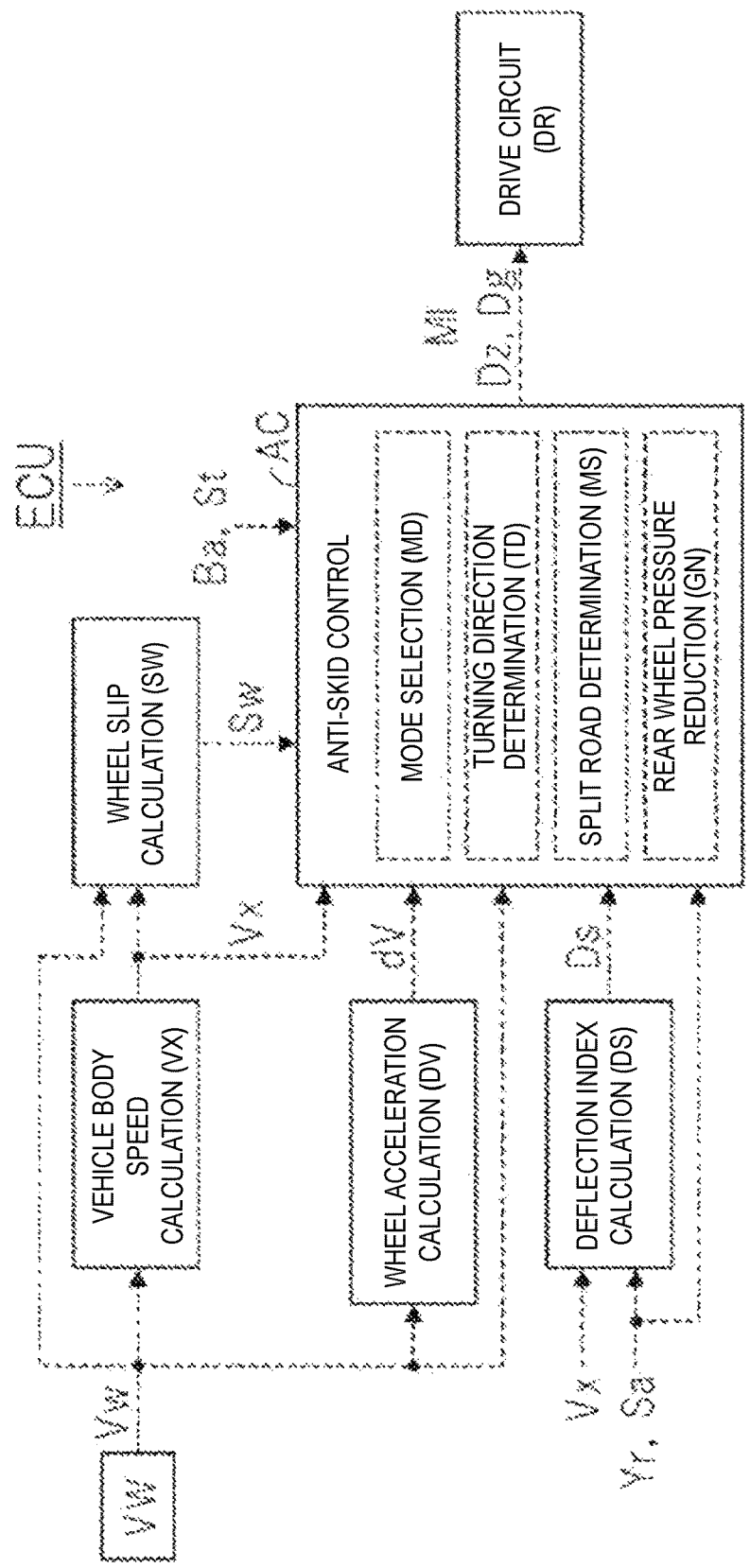
FIG. 2 is a function block diagram for explaining a calculation process in a controller ECU.

The calculation in the controller ECU will be described with reference to the function block diagram of FIG. 2. Wheel speed Vw, yaw rate Yr, steering angle Sa, braking operation amount Ba, and operation signal St are input to the controller ECU. The controller ECU includes a vehicle body speed calculation block VX, a wheel acceleration calculation block DV, a wheel slip calculation block SW, a deflection index calculation block DS, an anti-skid control block AC, and a drive circuit DR.

In the vehicle body speed calculation block VX, the vehicle body speed Vx is calculated on the basis of the wheel speed Vw. For example, during non-braking including when the vehicle is accelerating, the vehicle body speed Vx is calculated on the basis of the lowest of the four wheel speeds (or lowest wheel speed) Vw. During braking, the vehicle body speed Vx is calculated on the basis of the highest of the four wheel speeds (or highest wheel speed) Vw. Furthermore, the time change amount of the vehicle body speed Vx has limit values, such as an upper limit value aup of the increasing gradient and a lower limit value adn of the reducing gradient of the vehicle body speed Vx.

In the wheel acceleration calculation block DV, a wheel acceleration dV (or the time change amount of the wheel speed Vw) is calculated on the basis of the wheel speed Vw. Specifically, the wheel speed Vw is time differentiated to calculate the wheel acceleration dV.

In the wheel slip calculation block SW, a deceleration slip (or wheel slip) Sw of the wheel WH is calculated on the basis of the vehicle body speed Vx and the wheel speed Vw. The wheel slip Sw is a state quantity representing the degree of grip of the wheel WH on the traveling road surface. For example, a deceleration slip speed, which is the deviation between the vehicle body speed Vx and the wheel speed Vw, hV of the wheel WH is calculated as the wheel slip Sw (hV=Vx−Vw). Furthermore, a wheel slip ratio(=hV/Vx) in which the slip speed (or the speed deviation) hV is made dimensionless with the vehicle body speed Vx may be calculated as the wheel slip Sw.

The deflection index Ds is calculated in the deflection index block DS. The deflection state quantity Ds is a state quantity representing the degree of deflection of the vehicle, which is a difference between the vehicle direction corresponding to the steering angle Sa and the actual vehicle direction. In other words, the deflection state quantity Ds is a state variable representing the magnitude of vehicle deflection during the braking event when the vehicle is on a split coefficient of friction road surface. In addition, the deflection state quantity Ds is a state variable representing the magnitude of vehicle deflection during the braking event when the vehicle is turning. In the deflection index block DS, first, a standard turning amount Ys corresponding to the steering angle Sa and the actual turning amount Ya corresponding to the yaw rate Yr are calculated. The standard turning amount Ys is a state quantity representing the vehicle advancing direction intended by the driver. In other words, the standard turning amount Ys is a state variable representing the advancing direction of the vehicle when all wheels WH have a slight slip and are in a grip state. The actual turning amount Ya is a state quantity representing the actual advancing direction of the vehicle as a result of the driver's steering operation, anti-skid control, and the like. Here, the standard turning amount Ys and the actual turning amount Ya are calculated as the same physical quantity.

For example, the standard turning amount Ys and the actual turning amount Ya are calculated as the same physical quantity in the dimension of the yaw rate. In this case, the standard turning amount Ys (or the standard yaw rate) is determined on the basis of a predetermined relationship in consideration of the steering angle Sa, the vehicle body speed Vx, and the stability factor. The actual turning amount Ya is the same as the actual yaw rate Yr (i.e., Ya=Yr). Alternatively, the standard turning amount Ys and the actual turning amount Ya are calculated in the dimension of the steering angle. In this case, the standard turning amount Ys is the same as the steering angle Sa (i.e., Ys=Sa). Then, the actual turning amount Ya is calculated on the basis of the yaw rate Yr, the vehicle body speed Vx, and a predetermined relationship. In any case, the standard turning amount Ys is calculated on the basis of the steering angle Sa, and the actual turning amount Ya is calculated on the basis of the yaw rate Yr.

The turning amount deviation hY is calculated on the basis of the standard turning amount Ys and the actual turning amount Ya (i.e., hY=Ys−Ya). Then, the deflection index Ds is calculated on the basis of the turning amount deviation hY and the direction of the actual yaw rate Yr. Specifically, the deflection index Ds is calculated by the following equation (1).

$$Ds = \mathrm{sgn}(Yr)*(Ys-Ya) = \mathrm{sgn}(Yr)*hY \qquad \text{Equation (1)}$$

Here, the function "sgn" is a sign function (or signum function), and is a function that returns any of "1", "−1", and "0" according to the sign of the argument. For example, "sgn(Yr)=1" is calculated for the left turn, and "sgn(Yr)=−1" is calculated for the right turn.

In the anti-skid control block AC, the anti-skid control (or a braking control for inhibiting the lock tendency of the wheel WH is executed on the basis of the wheel acceleration dV, wheel slip Sw, braking operation amount Ba, operation signal St, vehicle body speed Vx, yaw rate Yr, steering angle Sa, and deflection index Ds, which is a state quantity representing the degree of vehicle deflection. The anti-skid control is a braking control for inhibiting the lock tendency of the wheel WH, or inhibiting the excessive deceleration slip. The anti-skid control block AC is configured to include a mode selection block MD, a turning direction determination block TD, a split road determination block MS, and a rear wheel pressure reducing block GN.

In the anti-skid control block AC, the controller ECU determine whether braking of the vehicle is occurring on the basis of at least one of the braking operation amount Ba and the operation signal St. When the conditions "the braking operation amount Ba is greater than or equal to a predetermined value bo" and/or "the operation signal St is in the ON state" are satisfied and determination is made that "braking of the vehicle is occurring", the execution of the anti-skid control (or ABS control) is permitted at each wheel WH.

In the mode selection block MD, the control mode is determined so that the braking hydraulic pressure Pw is increased or decreased individually for each wheel WH. This control mode is a general term for a reduction mode (or pressure reducing mode) Mg for reducing the braking hydraulic pressure Pw and an increase mode (or pressure increasing mode) Mz for increasing the braking hydraulic pressure Pw. In the mode selection block MD, a plurality of threshold values is predetermined to select a control mode of the anti-skid control. Either the reduction mode Mg or the increase mode Mz is selected on the basis of the mutual relationship between these threshold values and "the wheel acceleration dV and the wheel slip Sw". In addition, in the mode selection block MD, the reducing gradient Kga, which is a time change amount during reduction of the braking hydraulic pressure Pw, in the reduction mode Mg and the increasing gradient Kza, which is a time change amount during increase of the braking hydraulic pressure Pw, in the increase mode Mz are determined on the basis of the mutual relationship. Then, a duty ratio Dg of the outlet valve VO is calculated on the basis of the reducing gradient Kga. Furthermore, a duty ratio Dz of the inlet valve VI is determined on the basis of the increasing gradient Kza. This "duty ratio" is a ratio of the energization time (or ON time) per unit time.

When the reduction mode Mg is selected and the braking hydraulic pressure Pw is reduced by executing the anti-skid control, the inlet valve VI is closed and the outlet valve VO is opened. That is, the pressure increasing duty ratio Dz is determined to be 100%, or the inlet valve Vi is normally energized, and the outlet valve VO is driven on the basis of the pressure reducing duty ratio Dg. The braking fluid BF in the wheel cylinder CW flows into the low-pressure reservoir RL, and the braking hydraulic pressure Pw is reduced. This pressure reducing speed, which is a time gradient in the reduction or a reducing gradient of the braking hydraulic pressure Pw, is determined by the duty ratio Dg of the outlet valve VO. The outlet valve VO is in the normally-open state when the pressure reducing duty ratio Dg is 100%. In this state, the braking hydraulic pressure Pw is rapidly reduced. The outlet valve VO is closed, or the outlet valve is in non-energization when the duty ratio Dg is zero %.

When the increase mode Mz is selected and the braking hydraulic pressure Pw is increased by executing the anti-skid control, the inlet valve VI is opened, and the outlet valve VO is closed. That is, the pressure reducing duty ratio Dg is determined to be zero %, and the inlet valve VI is driven on the basis of the pressure increasing duty ratio Dz. The braking fluid BF is moved from the master cylinder CM to the wheel cylinder CW, and the braking hydraulic pressure Pw is increased. The pressure increasing speed, or a time gradient in the increase of the braking hydraulic pressure, increasing gradient Kz is adjusted by the duty ratio Dz of the inlet valve VI. The inlet valve VI is in the normally-open state when the pressure increasing duty ratio Dz is zero %. In this state, the braking hydraulic pressure Pw is rapidly increased. The inlet valve VI is closed when the pressure increasing duty ratio Dz is 100%, the inlet valve VI is normally energized.

When the braking hydraulic pressure Pw needs to be held during the execution of the anti-skid control, the outlet valve VO or the inlet valve VI is closed in the reduction mode Mg or the increase mode Mz. Specifically, when it is necessary to hold the braking hydraulic pressure Pw in the reduction mode Mg, the duty ratio Dg of the outlet valve VO is determined to be zero %, or the outlet valve VO is in normally-closed state. Furthermore, when it is necessary to hold the braking hydraulic pressure Pw in the increase mode Mz, the duty ratio Dz of the inlet valve VI is determined to be 100%, or he inlet valve VI is in normally-closed state.

In the turning direction determination block TD, the direction (or the turning direction) Td in which the vehicle is turning is determined on the basis of the yaw rate Yr. The yaw rate Yr is calculated as a signed state quantity. For example, when the sign of the yaw rate Yr is positive (+), turning in the left direction is determined as the turning direction Td, and when the sign is negative (−), the turning direction Td is determined to be the right direction. Furthermore, in the turning direction determination block TD, the inside Su and the outside Ss are identified in the turning direction on the basis of the turning direction Td. Specifically, when the turning direction Td is the left turn (or the yaw rate Yr is positive), the left wheels WHj and WHl, or the front and rear wheels WHuf and WHur on the inside of the turn, are determined as the wheels of the turning inside Su, and the right wheels WHi and WHk, or the front and rear wheels WHsf and WHsr on outside of the turn, are determined as the wheels of the turning outside Ss. On the other hand, when the turning direction Td is the right (or the yaw rate Yr is negative), the right front and rear wheels WHi and WHk are determined as the wheels on the inside Su of the turning, and the left front and rear wheels WHj and WHl are determined as the wheels on the outside Ss of the turning.

In the split road determination block MS, the controller ECU determines whether the road surface on which the vehicle travels is on a split coefficient of friction road surface having a different friction coefficient μ on the left and right (or the split road) by using a known method. For example, when the anti-skid control is started on one of the left and right wheels (particularly the front wheel), the vehicle travels being on the split road is determined on the basis of at least one of the wheel acceleration dV and the wheel slip (or the deceleration slip) Sw of the other wheel. Furthermore, in the split road determination block MS, when the vehicle is traveling on the split road surface is determined, the front and rear wheels WHhf, WHhr on the lower coefficient μ of friction road surface Mh (also simply referred to as "lower friction side"), and the front and rear wheels WHtf, WHtr on the higher coefficient μ of friction road surface Mt (also simply referred to as "higher friction side") are identified.

When the execution of the anti-skid control is started at the front wheel WHhf on the lower friction side Mh having a lower friction coefficient μ, the increasing gradient of the braking hydraulic pressure Pwtf of the front wheel WHtf on the higher friction side is limited to less than the gradient corresponding to the increase in the operation amount Ba even if the execution of the anti-skid control is not started at the front wheel WHtf on the higher friction side Mt having a higher friction coefficient μ. For example, when the left wheel is on a lower friction road surface Mh and the right wheel is on a higher friction road surface Mt with respect to the vehicle traveling direction, the anti-skid control is executed on the left front wheel WHj(=WHhf), or the left front wheel hydraulic pressure Pwj(=Pwhf) is increased or reduced. In this case, the anti-skid control is not executed on the right front wheel WHi(=WHhf). The increasing gradient (or a change amount with respect to time) of the right front wheel hydraulic pressure Pwi(=Pwtf) is limited to less than the increasing gradient corresponding to the operation amount Ba.

The anti-skid control is not independently executed on the wheels WHk and WHl (i.e., rear wheel WHr), and a so-called select low control is not performed. This "select low control" is to control braking hydraulic pressures Pwk, Pwl(=Pwr) of the rear wheels WHk and WHl(=WHr) on the basis of the slower wheel speed Vwk or Vwl of the rear wheels (i.e., the wheel with larger deceleration slip).

In the rear wheel pressure reducing block GN, when the anti-skid control is executed on the rear wheel WHur, which is the left or right rear wheel WHk, WHl(=WHr), on the inside of the turn based on the deflection index Ds and the turning direction Td, the pressure reducing duty ratio Dg is controlled so that the braking hydraulic pressure (referred to as "the outside rear wheel hydraulic pressure") Pwsr in the rear wheel WHsr on the outside of the turn is reduced on the basis of the deflection index Ds even if the execution threshold value of the anti-skid control is not reached. Specifically, when the anti-skid control is executed on the rear wheel WHur on the inside of the turn and the deflection index Ds is less than or equal to a start predetermined value (or a first start predetermined amount) dx, the inlet valve VI corresponding to the rear wheel WHsr on the outside of the turn on which the anti-skid control is not executed is closed, the pressure reducing duty ratio Dg is output to the outlet valve VO, and the braking hydraulic pressure (or the outside rear wheel hydraulic pressure) Pwsr of the rear wheel WHsr on the outside of the turn is reduced. Here, the start predetermined amount (or the first start predetermined value) dx is a threshold value for determining the start of reduction of the outside rear wheel hydraulic pressure Pwsr, and is a predetermined constant. For example, the start predetermined amount dx is determined as a value less than zero (e.g., a value slightly smaller than zero). Alternatively, the start predetermined amount dx can be set as a range having a predetermined width of less than zero.

When the deflection index Ds becomes less than or equal to the start predetermined amount (or the first start predetermined value) dx, the outside rear wheel hydraulic pressure Pwsr is reduced by a predetermined reducing hydraulic pressure (or the first predetermined reducing hydraulic pressure) pg at the reducing gradient (or the time change amount when reducing, first reducing gradient) Kgs. Here, the reducing gradient (first reducing gradient) Kgs and the predetermined reducing hydraulic pressure (or the first predetermined reducing hydraulic pressure) pg are predetermined constants (or predetermined values). When "Ds≤dx", the outside rear wheel hydraulic pressure Pwsr is suddenly reduced, and the directional stability of the vehicle is immediately modified. In addition, the reduction of the outside rear wheel hydraulic pressure Pwsr is limited to the braking hydraulic pressure (referred to as "inside rear wheel hydraulic pressure") Pwur of the turning inside rear wheel WHur on which the anti-skid control is executed. That is, the state in which the outside rear wheel hydraulic pressure Pwsr is reduced to the maximum is "Pwsr=Pwur", which is the same state as when the select low control is adopted. The braking hydraulic pressure Pw of each wheel WH is estimated based on the signal of each sensor (Pm, etc.) and the drive signal (Vi, Vo, etc.) of the electromagnetic valve (VI, VO, etc.). Furthermore, each wheel cylinder CW may be provided with a braking hydraulic pressure sensor so as to detect the braking hydraulic pressure Pw.

After the outside rear wheel hydraulic pressure Pwsr is reduced by a predetermined reducing hydraulic pressure pg (or up to the hydraulic pressure Pwur when the limit of the inside rear wheel hydraulic pressure Pwur is reached), the outside rear wheel hydraulic pressure Pwsr is gradually increased at the increasing gradient (or the time change amount when increasing, first increasing gradient) Kzs. That is, the absolute value of the increasing gradient (or the time change amount when increasing) Kzs of the outside rear wheel hydraulic pressure Pwsr is set to be less than the absolute value of the reducing gradient (or the time change amount when reducing) Kgs of the outside rear wheel hydraulic pressure Pwsr. In addition, the increase in the outside rear wheel hydraulic pressure Pwsr is limited to the hydraulic Pd (referred to as "limiting hydraulic pressure (first limiting hydraulic pressure)", "Pd=Pwur+pd") obtained by adding a predetermined increasing hydraulic pressure (or a first predetermined increasing hydraulic pressure) pd to the inside rear wheel hydraulic pressure Pwur. Here, the increasing gradient (or the first increasing gradient) Kzs and the predetermined increasing hydraulic pressure (or the first predetermined increasing hydraulic pressure) pd are preset constants (or predetermined values).

When the deflection index Ds does not become greater than or equal to an end predetermined amount (or a first end predetermined amount) dy even after a predetermined time (or a first predetermined time) td has elapsed from when the outside rear wheel hydraulic pressure Pwsr is suddenly reduced (i.e., when the vehicle deflection is not converged), the outside rear wheel hydraulic pressure Pwsr is again reduced by the predetermined reducing hydraulic pressure pg at the reducing gradient Kgs. The outside rear wheel hydraulic pressure Pwsr is thereafter increased at the increasing gradient Kzs. Thereafter, this cycle (of increase/reduction in braking hydraulic pressure Pwsr) is repeated until the deflection index Ds becomes greater than or equal to the end predetermined amount dy. Here, the end predetermined amount (or the first end predetermined amount) dy is a threshold value for determining the end of the pressure reduction adjustment of the outside rear wheel hydraulic pressure Pwsr, and is a preset constant (or a predetermined value) of greater than or equal to the start predetermined amount (or the first start predetermined amount) dx.

In the rear wheel pressure reducing block GN, when the deflection index Ds becomes greater than or equal to the end predetermined amount dy by reducing the outside rear wheel hydraulic pressure Pwsr (or the braking hydraulic pressure of the rear wheel on the outside in the turn Ss), the outside rear wheel hydraulic pressure Pwsr is increased to the hydraulic pressure (e.g., master cylinder hydraulic pressure Pm) corresponding to the braking operation amount Ba. At this time, the outside rear wheel hydraulic pressure Pwsr is gradually increased so that the directional stability of the vehicle does not change suddenly.

In the rear wheel pressure reducing block GN, the pressure reducing duty ratio Dg is adjusted so that the braking hydraulic pressure (referred to as "higher friction side rear wheel hydraulic pressure") Pwtr of the rear wheel (higher friction side rear wheel) WHtr on the higher coefficient of friction road surface Mt is reduced based on the deflection index Ds even if the state quantities Sw, dV have not reached the execution threshold value of the anti-skid control when the anti-skid control is executed on the rear wheel, which is the lower friction side rear wheel, WHhr on the lower coefficient of friction coefficient road surface Mh of the left and right rear wheels WHr based on the deflection index Ds and the identification result in the split road determination block MS. As in the case of turning braking, when the anti-skid control is executed on the lower friction side rear wheel WHhr and the deflection index Ds is less than or equal to the start predetermined amount (or a second start predetermined amount) sx, the inlet valve VI connected to the higher friction side rear wheel WHtr on which the anti-skid control is not executed is e closed, the pressure reducing duty ratio Dg is output to the outlet valve VO, and the braking hydraulic pressure (or higher friction side rear wheel hydraulic pressure) Pwtr of the higher friction side rear wheel WHtr on is reduced. Here, the start predetermined amount (or the second start predetermined amount) sx is a threshold value for determining the start of reduction of the higher friction side rear wheel hydraulic pressure Pwtr, and is a preset constant (predetermined value). For example, the start predetermined amount sx is determined as a value less than zero. Alternatively, the start predetermined amount sx can be set as a range having a predetermined width of less than zero.

When the deflection index Ds becomes less than or equal to the start predetermined amount (or the second start predetermined amount) sx, the higher friction side rear wheel hydraulic pressure Pwtr is reduced by a predetermined reducing hydraulic pressure (or the second predetermined reducing hydraulic pressure) pe at the reducing gradient (or the time change amount when reducing) Kgt. This reducing gradient (or the second reducing gradient) Kgt and the predetermined reducing hydraulic pressure (or the second predetermined reducing hydraulic pressure) pe are preset constants (or predetermined values). When "Ds≤sx", the higher friction side rear wheel hydraulic pressure Pwtr is suddenly reduced, and the directional stability of the vehicle is immediately modified. In addition, reducing the higher friction side rear wheel hydraulic pressure Pwtr is limited to the rear wheel hydraulic pressure (referred to as "lower friction side rear wheel hydraulic pressure") Pwhr on the low friction coefficient side Mh. That is, the state in which the higher friction side rear wheel hydraulic pressure Pwtr is reduced to the maximum is "Pwtr=Pwhr (select low state)". The braking hydraulic pressure Pw of each wheel WH is estimated on the basis of the signal from each sensor (Pm, etc.) and the drive signal (Vi, Vo, etc.) from the electromagnetic valve (VI, VO, etc.). Furthermore, each wheel cylinder CW may be provided with a braking hydraulic pressure sensor to detect the braking hydraulic pressure Pw.

When the higher friction side rear wheel hydraulic pressure Pwtr is reduced by a predetermined reducing hydraulic pressure pe (or up to the hydraulic pressure Pwur when the limit of the lower friction side rear wheel hydraulic pressure Pwhr is reached), the higher friction side rear wheel hydraulic pressure Pwtr is gradually increased at the increasing gradient (or the time change amount during the wheel hydraulic pressure increasing) Kzt. That is, the absolute value of the increasing gradient (or the time change amount during the wheel hydraulic pressure increasing) Kzt of the higher friction side rear wheel hydraulic pressure Pwtr is set to be less than the absolute value of the reducing gradient (time change amount during the wheel hydraulic pressure reducing) Kgt of the higher friction side rear wheel hydraulic pressure Pwtr. In addition, the increase in the higher friction side rear wheel hydraulic pressure Pwtr is limited to the hydraulic pressure Ps (referred to as "a limiting hydraulic pressure (second limiting hydraulic pressure), "Ps=Pwhr+ps") obtained by adding a predetermined increasing hydraulic pressure ps to the lower friction side rear wheel hydraulic pressure Pwhr. This increasing gradient (or a second increasing gradient) Kzt and the predetermined increasing hydraulic pressure (or a second predetermined increasing hydraulic pressure) ps are preset constants (or predetermined values).

When the deflection index Ds does not become greater than or equal to the end predetermined amount (or a second end predetermined amount) sy, or when the vehicle deflection is not converged even after a predetermined time (or a second predetermined time) is has elapsed from when the higher friction side rear wheel hydraulic pressure Pwtr is suddenly reduced, the higher friction side rear wheel hydraulic pressure Pwtr is again reduced by the predetermined reducing hydraulic pressure pe at the reducing gradient Kgt. The higher friction side rear wheel hydraulic pressure Pwtr is thereafter increased at the increasing gradient Kzt. Thereafter, this cycle (of increase/reduction in braking hydraulic pressure Pwtr) is repeated until the deflection index Ds becomes greater than or equal to the end predetermined amount sy. This end predetermined amount (or the second end predetermined amount) sy is a threshold value for determining the end of the pressure reduction adjustment of the higher friction side rear wheel hydraulic pressure Pwtr, and is a preset constant (or predetermined value) of greater than or equal to the start predetermined amount (or a second start predetermined amount) sx.

In the rear wheel pressure reducing block GN, when the deflection index Ds becomes greater than or equal to the end predetermined amount sy by the reduction of the higher friction side rear wheel hydraulic pressure Pwtr, the higher friction side rear wheel hydraulic pressure Pwtr is increased to the hydraulic pressure (e.g., the master cylinder hydraulic pressure Pm) corresponding to the braking operation amount Ba. At this time, the outside rear wheel hydraulic pressure Pwsr is gradually increased so that the directional stability of the vehicle does not change suddenly.

In the drive circuit DR, the electromagnetic valves VI, VO and the electric motor ML are driven on the basis of the pressure increasing/decreasing duty ratios Dz, Dg and the drive signal Ml. In the drive circuit DR, a drive signal Vi for the inlet valve VI is calculated on the basis of the pressure increasing duty ratio Dz to execute the anti-skid control, and a drive signal Vo for the outlet valve VO is determined on the basis of the pressure reducing duty ratio Dg. Furthermore, the drive signal Ml is calculated to drive the electric motor ML at a predetermined rotation number set in advance. The braking fluid BF is returned from the low-pressure reservoir RL to the upper portion Bw of the inlet valve VI by the drive of the electric pump DL.

{Operation During Turning}

Figure 3:
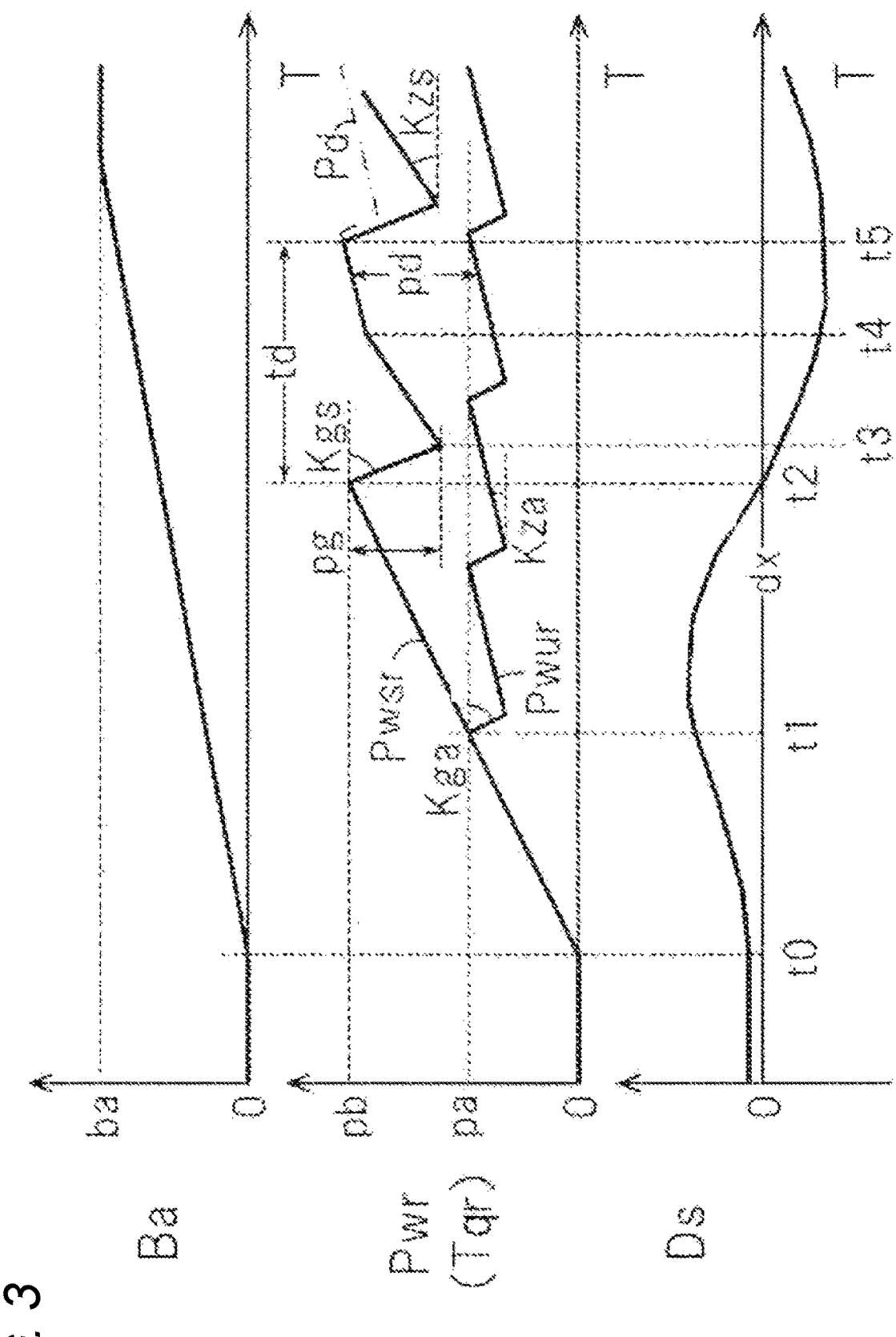
FIG. 3 is a time-series diagram for explaining the operation during turning.

The operation of the braking control device SC during turning braking will be described with reference to the time-series diagram (or the change diagram with respect to time T) of FIG. 3. In the braking control device SC, the turning direction Td of the vehicle is determined on the basis of the yaw rate Yr, and the inside (or the inside of the turn) Su and the outside (or the outside of the turn) Ss are identified with reference to the turning direction. The diagram assumes a situation where the driver performs braking operation while the vehicle is making a steady turn, and the anti-skid control is executed on rear wheel WHur on the inside of the turn but the anti-skid control is not executed on the rear wheel WHsr on the outside of the turn. That is, the wheel slip Swsr and the wheel acceleration dVsr of the rear wheel WHsr on the outside of the turn have not reached the execution threshold values of control, and the anti-skid control has not been started in the rear wheel WHsr on the outside of the turn. In the anti-skid control, the select low method is not executed on the rear wheels WHr, and independent control is executed on the rear wheels WHr, which are the left and right wheels.

While the vehicle is in the turn, the load shift occurs from the inside Su of the turn to the outside Ss of the turn. Additionally, the ground load (or the vertical force) of front and rear wheels WHsf and WHsr on the outside becomes larger than that of the front and rear wheels WHuf and WHur on the inside of the turn. Therefore, in the independent type anti-skid control, the execution of the control is started earlier in the front and rear wheels WHuf and WHur on the inside than in the front and rear wheels WHsf and WHsr on outside of the turn. Furthermore, the plurality of threshold values described above is set to be more difficult to start the anti-skid control at the rear wheel WHr than at the front wheel WHf to maintain the stability of the vehicle. Therefore, in a normal case (e.g., when the coefficient μ of friction road surface is uniform), in the four-wheel independent type anti-skid control, first, the anti-skid control is started at the front wheel WHuf on the inside of the turn, and the inside front wheel hydraulic pressure Pwuf is reduced.

Before time point t0, the vehicle is in a steady turn in a non-braking state. At time point t0, the braking operation is started, and the operation amount Ba starts to increase from zero. As the operation amount Ba increases, the rear wheel braking hydraulic pressure Pwr (as a result, the rear wheel braking torque Tqr) increases. Until time point t1, the wheel slip Swr and the wheel acceleration dVr of the rear wheel WHr are still less than the control threshold values, and thus the anti-skid control is not executed.

At time point t1, the inside and outside rear wheel hydraulic pressures Pwur and Pwsr(=Pwr) become the value pa. The wheel slip Swur and the wheel acceleration dVur of the the rear wheel WHur on inside of the turn, whose vertical load is reduced due to the vehicle turn, reach the threshold values of the anti-skid control, and the execution of the anti-skid control is started at the rear wheel WHur on the inside of the turn. Then, the inside rear wheel hydraulic pressure Pwur is suddenly reduced at the reducing gradient Kga by the start of the execution of the anti-skid control. After point t1, the execution of the anti-skid control is continued on the rear wheel WHur on the inside of the turn. At this time, since there is a margin in the wheel grip in the rear wheel WHsr on the outside of the turn where the vertical load is increased, the anti-skid control is not executed. As a result, the deflection index Ds changes due to the decrease in the lateral force of the rear wheel WHr.

At time point t2, the deflection index Ds becomes less than or equal to the first predetermined amount dx (e.g., a value slightly smaller than zero) (i.e., Ds<0), and the outside rear wheel hydraulic pressure Pwsr stars to reduce rapidly by the first predetermined reduction amount pg at the first reducing gradient Kgs. The left and right difference in braking force at the rear wheel WHr is reduced by reducing the outside rear wheel hydraulic pressure Pwsr. At time point t3, the amount of reduction in the outside rear wheel hydraulic pressure Pwsr reaches the first predetermined reduction amount pg, and the outside rear wheel hydraulic pressure Pwsr gradually increases at the first increasing gradient Kzs. Here, each gradient is set to "|Kzs|<|Kgs|". At time point t4, the outside rear wheel hydraulic pressure Pwsr reaches the first limiting hydraulic pressure Pd(=Pwur+pd), and hence its increase is limited. Thus, the difference between the outside rear wheel hydraulic pressure Pwsr and the inside rear wheel hydraulic pressure Pwur is limited to within the range of the first predetermined increasing hydraulic pressure pd.

At time point t5, the first predetermined time td has elapsed from time point t2 when the rapid reduction of the outside rear wheel hydraulic pressure Pwsr is started. However, since the deflection index Ds is less than the first end predetermined amount dy, the outside rear wheel hydraulic pressure Pwsr is suddenly reduced again at the reducing gradient Kgs. When the outside rear wheel hydraulic pressure Pwsr is reduced by a predetermined reduction amount pg, the outside rear wheel hydraulic pressure Pwsr is gradually increased at the increasing gradient Kzs. This increase/decrease is repeated thereafter until "Ds≥dy" is satisfied.

{Operation in Split Road}

Figure 4:
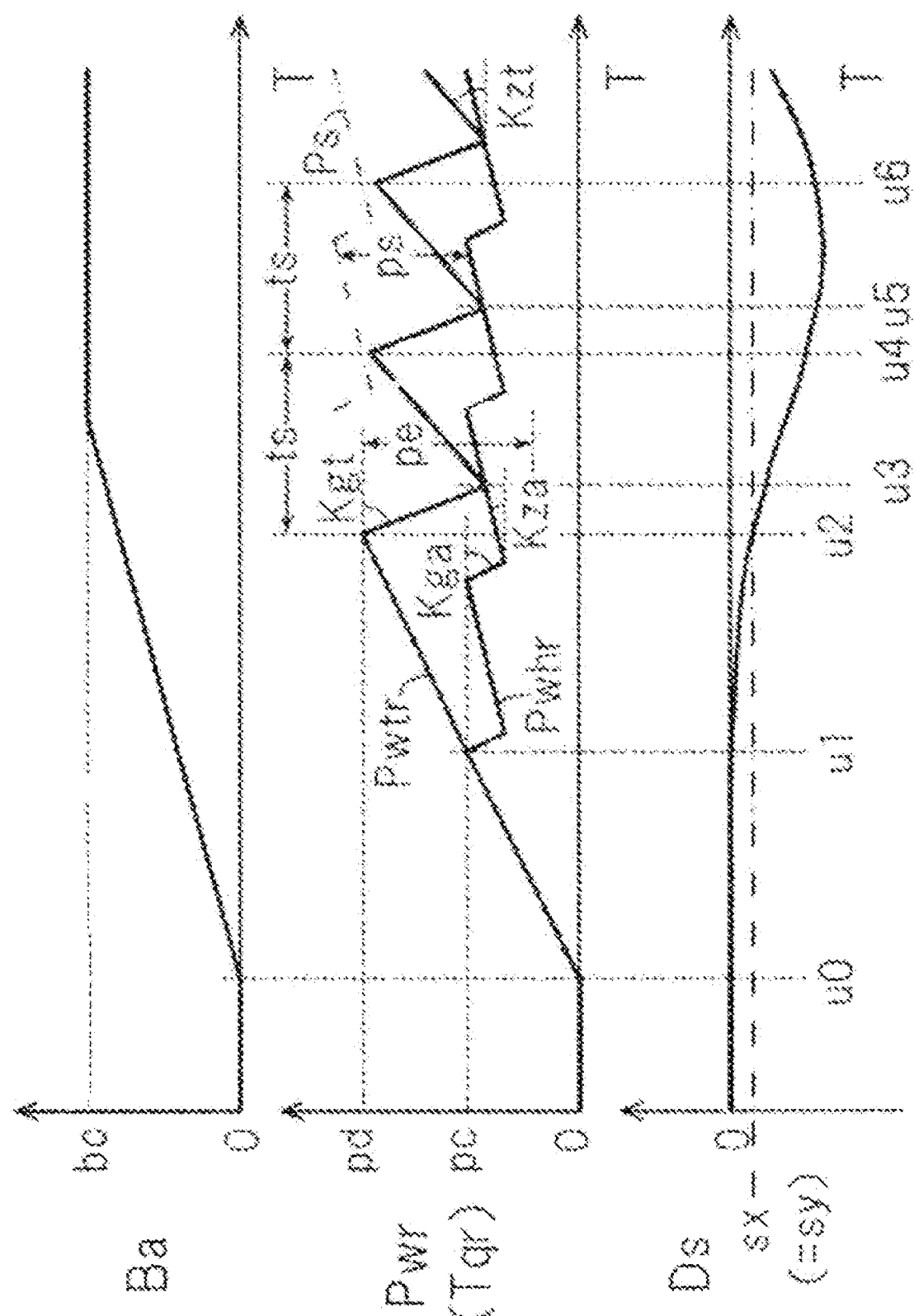
FIG. 4 is a time-series diagram for explaining the operation in a split road.

The operation of the braking control device SC on the split coefficient of friction road surface will be described with reference to the time series diagram of FIG. 4. The diagram assumes a situation where the anti-skid control is executed on the split coefficient of friction road surface in which the friction coefficient μ differs greatly in the lateral direction of the vehicle (or the vehicle width direction). In the braking control device SC, the high side Mt and the low side Mh are distinguished in the road surface friction coefficient μ in the vehicle width direction based on at least one of the wheel acceleration dV and the wheel slip Sw. Then, the front and rear wheels WHtf and WHtr on the higher friction coefficient side (or on the higher coefficient of friction road surface) Mt and the front and rear wheels WHhf and WHhr on the lower friction coefficient side (or on lower coefficient of friction road surface) Mh are determined (or identified). The select low type anti-skid control is not executed on the rear wheels WHr, and an independent control is executed on the left and right rear wheel WHr.

The four-wheel independent type anti-skid control is executed earlier on the front and rear wheels WHhf, WHhr on the lower coefficient μ of friction road surface Mh than on the front and rear wheels WHtf and WHtr on the higher coefficient μ of friction road surface. In addition, in order to maintain the stability of the vehicle, the control threshold value of the rear wheel WHr is set so that the anti-skid control is less likely to be started than the front wheel WHf. Therefore, on the split coefficient of friction road surface, first, the anti-skid control is started on the front wheel WHhf on the lower coefficient of friction road surface, and the low friction side front wheel hydraulic pressure Pwhf is reduced.

Before time point u0, the vehicle is in a non-braking state and a straight-advancing state, and the deflection index Ds is zero. At time point u0, the braking operation is started, and the operation amount Ba starts to increase from zero. As the operation amount Ba increases, the rear wheel braking hydraulic pressure Pwr (as a result, the rear wheel braking torque Tqr) increases. Until time point u1, the wheel slip Swr and the wheel acceleration dVr of the rear wheel WHr are still less than the control threshold values, and thus the anti-skid control is not executed.

At time point u1, the rear wheel braking hydraulic pressures Pwhr and Pwtr(=Pwr) become the value pc. The wheel slip Swhr and wheel acceleration dVhr of the rear wheel WHhr on lower coefficient of friction road surface reach the control threshold values, and the execution of the anti-skid control is started on the rear wheel WHhr on the lower coefficient of friction road surface. Then, the lower friction side rear wheel hydraulic pressure Pwhr is suddenly reduced at the reducing gradient Kga by the execution of the anti-skid control. After time point u1, the execution of the anti-skid control is continued on the rear wheel WHhr on the lower coefficient of friction road surface. At this time, since there is a margin in the wheel grip in the rear wheel on the higher friction side Mt (the rear wheel on the higher coefficient of friction road surface) WHtr, the anti-skid control is not executed. As a result, the deflection index Ds starts to decrease from zero due to the left and right difference in the braking force between the braking force of the lower friction side rear wheel WHhr and the higher friction side rear wheel WHtr.

At time point u2, the deflection index Ds becomes less than or equal to the second start predetermined amount sx, and thus the higher friction side rear wheel hydraulic pressure Pwtr starts to reduce rapidly by the second predetermined reduction amount pe at the second reducing gradient Kgt even though the operation amount Ba is increased. At time point u3, the higher friction side rear wheel hydraulic pressure Pwtr reaches the lower friction side rear wheel hydraulic pressure Pwhr, so that further reduction in hydraulic pressure is limited and is not reduced to lower than or equal to the lower friction side rear wheel hydraulic pressure Pwhr.

The higher friction side rear wheel hydraulic pressure Pwtr that has been reduced at time point u3 is gradually increased at the second increasing gradient Kzt. Here, each gradient is set to "|Kzt|<|Kgt|". The increase in the higher friction side rear wheel hydraulic pressure Pwtr is limited to the second limiting hydraulic pressure Ps(="Pwhr+ps"). At time point u4, the second predetermined time is has elapsed from time point u2 when the sharp reduction of the higher friction side rear wheel hydraulic pressure Pwtr is started. However, since the deflection index Ds is less than the second end predetermined amount sy (e.g., sy=sx), the higher friction side rear wheel hydraulic pressure Pwtr is again suddenly reduced at the reducing gradient Kgt. When the higher friction side rear wheel hydraulic pressure Pwtr is reduced by a predetermined reduction amount pe or to the lower friction side rear wheel hydraulic pressure Pwhr, the higher friction side rear wheel hydraulic pressure Pwtr is gradually increased at the increasing gradient Kzt. This increase/decrease is repeated thereafter until "Ds≥sy" is satisfied.

{Operation/Effect}

The operation and effect of the braking control device SC will be described with reference to the time series diagram of FIG. 5.

The braking control device SC is configured by including a fluid unit (or an actuator) HU for individually adjusting the braking hydraulic pressure Pw (as a result, braking torque Tq) of each wheel WH, four wheel speed sensors VW for each detecting the speed Vw of the wheel, a yaw rate sensor YR for detecting the yaw rate Yr of the vehicle, a steering angle sensor SA for detecting the steering angle Sa of the vehicle, and a controller ECU for controlling the actuator HU. In the controller (or the electronic control unit) ECU, the braking hydraulic pressure Pwr in the rear wheel WHr is adjusted independently in the left-right direction (vehicle width direction) based on each wheel speed Vw, the yaw rate Yr, and the steering angle Sa. A so-called four-wheel independent type anti-skid control (anti-lock control) is executed.

First, time of turning braking of the vehicle will be described. The controller ECU determines the outside (or the turning outside) Ss and the inside (or the turning inside) Su in the turning direction Td of the vehicle based on the yaw rate Yr. Furthermore, the controller ECU calculates the deflection index Ds is on the basis of the standard turning amount Ys corresponding to the steering angle Sa and the actual turning amount Ya corresponding to the yaw rate Yr. The deflection index Ds is a state quantity corresponding to the deviation hY between the standard turning amount Ys and the actual turning amount Ya, and represents the degree of vehicle deflection (or the deviation in the actual advancing direction with respect to the traveling direction of the vehicle instructed by the steering angle Sa).

When the anti-skid control, which is the control for inhibiting excessive deceleration slip, is executed on the rear wheel WHur on the inside of the turn, the braking hydraulic pressure Pwsr (i.e., the braking torque Tqsr) of the rear wheel WHsr on the outside Ss of the turn is reduced on the basis of the deflection index Ds. The reduction in the outside rear wheel hydraulic pressure Pwsr is limited to the inside rear wheel hydraulic pressure Pwur. That is, a case where the outside rear wheel hydraulic pressure Pwsr is most limited corresponds to a case where the select low type anti-skid control is executed in the hydraulic pressure adjustment of the rear wheel WHr. Further, the difference between the outside rear wheel hydraulic pressure Pwsr and the inside rear wheel hydraulic pressure Pwur is limited to a predetermined hydraulic pressure pd.

Figure 5:
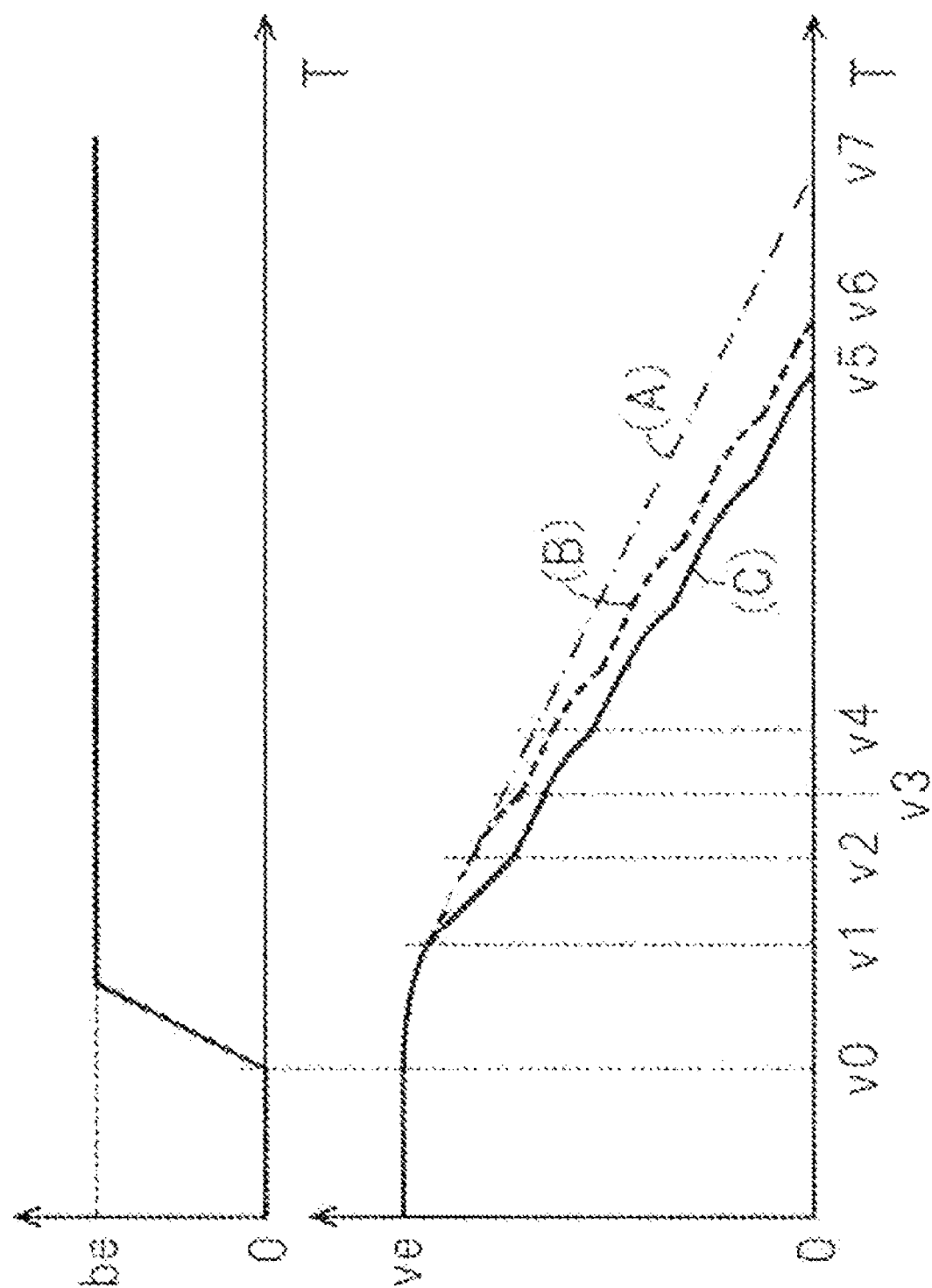
FIG. 5 is a time-series diagram for explaining operations and effects.

FIG. 5 shows the results of comparing the following three controls. Control (A) indicated by a dashed line indicates "always executing the select low method in the turning outside rear wheel hydraulic pressure Pwsr (i.e., "Pwsr=Pwur")", control (B) indicated by a broken line indicates "executing the select low method in the rear wheel at the beginning of the execution of the anti-skid control, and thereafter, the outside rear wheel hydraulic pressure Pwsr is gradually increased on the basis of the deflection index Ds", and control (C) indicated by a solid line indicates "executing the independent method for the left and right rear wheels WHr at the beginning of the execution of the anti-skid control, and thereafter, the outside rear wheel hydraulic pressure Pwsr is rapidly reduced on the basis of the deflection index Ds (correspond to the braking control device SC according to the present disclosure)".

At time point v0, braking is started, and at time point v1, the execution of the anti-skid control is started at the rear wheel WHur on the inside of the turn. In the controls (A) and (B), the outside rear wheel hydraulic pressure Pwsr is controlled on the basis of the select low method, and hence the vehicle deceleration Gx (or the amount of decrease in vehicle speed Vx per unit time) from time points v1 to v2 is the same. In the control (B), the deflection index Ds increases at time point v2, so that the outside rear wheel hydraulic pressure Pwsr is gradually increased, and the deceleration Gx becomes larger than in the control (A). Then, in the control (B), when the deflection index Ds decreases, the outside rear wheel hydraulic pressure Pwsr reduces. This cycle is repeated and the vehicle is stopped at time point v6. Since the braking distance of the vehicle is an integral value of the vehicle body speed Vx, the braking distance can be shortened in the control (B) than in the control (A).

In the control (C) as well, at time point v1, the execution of the anti-skid control is started at the rear wheel WHur on the inside of the turn. In the control (C), since the outside rear wheel hydraulic pressure Pwsr is controlled on the basis of the left-right independent method, the vehicle deceleration Gx from time points v1 to v2 is greater than that in the control (A) and (B). At time point v2 when the deflection index Ds decreases and becomes "Ds≤dx", the outside rear wheel hydraulic pressure Pwsr is rapidly reduced by the predetermined reducing hydraulic pressure pg. Thereafter, the outside rear wheel hydraulic pressure Pwsr is gradually increased. If "Ds≥dy(≥dx)" is not satisfied even after a predetermined time td has elapsed from the start time v2 of the hydraulic pressure reduction, the cycle of increasing/decreasing the outside rear wheel hydraulic pressure Pwsr is repeated, and the vehicle is stopped at time point v5. The braking distance of the control (C) can be further shortened than that of the control (B).

As described above, since the left-right independent method is executed with the anti-skid control of the rear wheel WHr, sufficient the vehicle can be decelerated sufficiently and the braking distance can be shortened. Furthermore, since the hydraulic pressure (or the outside rear wheel hydraulic pressure) Pwsr of the rear wheel WHsr on the outside of the turn is reduced on the basis of the deflection index Ds, the directional stability of the vehicle can be improved. As a result, in anti-skid control during turning, both the directional stability and the deceleration of the vehicle can be suitably satisfied.

Next, time of braking on the split coefficient of friction road surface will be described. In the braking control device SC, the controller ECU determines whether the vehicle is on a split coefficient of friction road surface, or whether the vehicle is traveling on a road surface where the friction coefficient μ of the road surface of the left wheel is different from that of the right wheel, on the basis of the speed Vw of the four wheels, and determines the wheel on the higher coefficient μ of friction road surface (or the higher friction side) Mt and the wheel on the lower coefficient μ of friction road surface (or the lower friction side). For example, these are determined by comparing at least one of the wheel acceleration dV and the wheel slip Sw between the left and right wheels. Furthermore, the controller ECU calculates the deflection index Ds on the basis of the deviation hY between the standard turning amount Ys corresponding to the steering angle Sa and the actual turning amount Ya corresponding to the yaw rate Yr. Then, when the anti-skid control is executed to inhibit excessive deceleration slip at the rear wheel WHhr on the lower coefficient of friction road surface Mh, the hydraulic pressure Pwtr (as a result, the braking torque Tqtr) of the rear wheel WHtr on the higher coefficient of friction road surface Mt is reduced on the basis fo the deflection index Ds. Similarly to the time of turning braking, the reduction in the higher friction side rear wheel hydraulic pressure Pwtr is limited to the lower friction side rear wheel hydraulic pressure Pwhr. Furthermore, the difference between the higher friction side rear wheel hydraulic pressure Pwtr and the lower friction side rear wheel hydraulic pressure Pwhr is limited to a predetermined hydraulic pressure ps.

In the anti-skid braking on a split coefficient of friction road surface, the left-right independent method is executed at the rear wheel WHr, so that sufficient vehicle deceleration Gx can be secured. Furthermore, since the higher friction side rear wheel hydraulic pressure Pwtr is reduced at the time point when the deflection index Ds becomes less than or equal to the start predetermined amount sx, the directional stability of the vehicle can be maintained. As a result, both the directional stability and the deceleration of the vehicle can be suitably satisfied when braking on the split coefficient of friction road surface.

Other Embodiments

Other embodiments will be described below. In other embodiments as well, the same effects as described above, which is satisfaction of both directional stability and deceleration of the vehicle during turning braking and braking on the split coefficient of friction road surface, are obtained.

In the embodiment described above, a diagonal fluid passage is exemplified as the two-system fluid passage. In place thereof, a front-rear type (also referred to as "II-type") configuration may be used. In the front-rear fluid passage, the wheel cylinders CWi and CWj for the front wheels are connected to the first master cylinder fluid passage HM1 (i.e., the first system). In addition, the wheel cylinders CWk and CW1 for the rear wheels are connected to the second master cylinder fluid passage HM2 (i.e., the second system).

In the embodiments described above, the configuration of the disc type braking device (or a disc brake) has been exemplified. In this case, the friction member is a brake pad and the rotating member is a brake disc. Instead of the disc type braking device, a drum type braking device (or a drum brake) can be adopted. In a case where a drum brake is used, a brake drum is adopted in place of the caliper. The friction member is a brake shoe, and the rotating member is a brake drum.

In the embodiments described above, the hydraulic braking control device SC using the braking fluid BF has been exemplified. Instead, an electric braking control device SC that does not use the braking fluid BF is used. In this device, the rotation of the electric motor is converted into linear power by a screw mechanism or the like, and the friction member is pressed against the rotating member KT. In this case, the braking torque Tq is generated by the pressing force of the friction member against the rotating member KT generated by using the electric motor as a power source instead of the braking hydraulic pressure Pw.

The invention claimed is:

1. A vehicle braking control device for a vehicle including four wheels, the vehicle braking control device, comprising:
   an actuator configured to individually adjust braking torque of each wheel of a vehicle;
   wheel speed sensors configured to each detect speed of the wheel;
   a yaw rate sensor configured to detect a yaw rate of the vehicle;
   a steering angle sensor configured to detect a steering angle of the vehicle; and
   a controller
   configured to control the actuator to adjust individually each of braking torques of rear wheels that are a rear right wheel or a rear left wheel by using the steering angle,
   configured to determine an inside and an outside of a turn by using the yaw rate,
   configured to calculate a deflection index by using a standard turning amount corresponding to the steering angle and an actual turning amount corresponding to the yaw rate, configured to reduce the braking torque of the rear wheel on the outside of the turn by using the deflection index when an excessive deceleration slip of the rear wheel on the inside of the turn is inhibited during an execution of anti-skid control.

2. A vehicle braking control device for a vehicle including four wheels, the vehicle braking control device, comprising:
   an actuator configured to individually adjust braking torque of each wheel of a vehicle;
   wheel speed sensors configured to each detect speed of the wheel;
   a yaw rate sensor configured to detect a yaw rate of the vehicle;
   a steering angle sensor configured to detect a steering angle of the vehicle; and
   a controller
   configured to control the actuator to adjust individually each of braking torques of rear wheels that are a rear right wheel or a rear left wheel by using the steering angle,
   configured to determine by using the speed of each wheel that the vehicle is on a split coefficient of friction road surface, to determine which the rear wheel is on a lower coefficient of friction road surface, to determine which the rear wheel is on a higher coefficient of friction road surface
   configured to calculate a deflection index by using a standard turning amount corresponding to the steering angle and an actual turning amount corresponding to the yaw rate, and
   configured to reduce the braking torque of the rear wheel on the higher coefficient of friction road surface by using the deflection index when an excessive deceleration slip of the rear wheel on the lower coefficient of friction road surface is inhibited during an execution of anti-skid control.

* * * * *